(12) United States Patent
Ho et al.

(10) Patent No.: US 7,236,181 B2
(45) Date of Patent: Jun. 26, 2007

(54) APPARATUS FOR COLOR CONVERSION AND METHOD THEREOF

(75) Inventors: Hung-Hui Ho, Kao-Hsiung (TW); Jin-Sheng Gong, Tao-Yuan Hsien (TW); Issac Chen, Kao-Hsiung (TW)

(73) Assignee: Realtek Semiconductor Corp., HsinChu (TW)

( * ) Notice: Subject to any disclaimer, the term of this patent is extended or adjusted under 35 U.S.C. 154(b) by 110 days.

(21) Appl. No.: 10/604,599

(22) Filed: Aug. 3, 2003

(65) Prior Publication Data

US 2005/0024382 A1 Feb. 3, 2005

(51) Int. Cl.
*G09G 5/02* (2006.01)

(52) U.S. Cl. ............... 345/601; 345/600; 345/602; 345/589

(58) Field of Classification Search .......... 345/589, 345/600–605, 660, 88; 358/518–519; 341/106; 382/251; 348/651
See application file for complete search history.

(56) References Cited

U.S. PATENT DOCUMENTS

| | | | | |
|---|---|---|---|---|
| 5,272,468 A | * | 12/1993 | Read | 345/604 |
| 5,579,031 A | * | 11/1996 | Liang | 345/604 |
| 5,596,510 A | * | 1/1997 | Boenke | 358/523 |
| 5,841,422 A | * | 11/1998 | Shyu | 345/604 |
| 6,043,804 A | * | 3/2000 | Greene | 345/601 |
| 6,211,917 B1 | * | 4/2001 | Shyu | 345/603 |
| 6,333,762 B1 | * | 12/2001 | Yoo et al. | 348/441 |
| 6,342,896 B1 | * | 1/2002 | Shetter et al. | 345/589 |
| 6,388,648 B1 | * | 5/2002 | Clifton et al. | 345/88 |
| 6,522,778 B1 | * | 2/2003 | Tamagawa | 382/167 |
| 6,621,497 B1 | * | 9/2003 | Sugiura et al. | 345/600 |
| 6,654,026 B2 | * | 11/2003 | Lee | 345/600 |
| 6,694,061 B1 | * | 2/2004 | Acharya | 382/251 |
| 6,774,953 B2 | * | 8/2004 | Champion et al. | 348/651 |
| 7,015,839 B1 | * | 3/2006 | Chang et al. | 341/106 |
| 7,068,283 B2 | * | 6/2006 | Huang | 345/602 |
| 7,176,938 B2 | * | 2/2007 | Feng | 345/600 |
| 2001/0033287 A1 | * | 10/2001 | Naegle et al. | 345/601 |
| 2003/0234795 A1 | * | 12/2003 | Lee | 345/601 |

\* cited by examiner

*Primary Examiner*—Bipin Shalwala
*Assistant Examiner*—Prabodh Dharia
(74) *Attorney, Agent, or Firm*—Winston Hsu (57) ABSTRACT

A color conversion apparatus and a method of color conversion are described for converting a first color in a first color space to a second color in a second color space. The color conversion apparatus includes a plurality of lookup tables storing color mappings relating the first color space to the second color space and a converter using the lookup tables to convert the first color to the second color. The first color space is the sRGB color space and the second color space is a device dependent color space, or vice versa. To reduce the table size, tables having little effect on the second color contain groups of input colors mapping to a same output color and are implemented with a memory having the address inputs connected to the upper most significant bits of an incoming color value. A gamma correction circuit is used to calculate the remaining tables.

12 Claims, 7 Drawing Sheets

$$\begin{bmatrix} R' \\ G' \\ B' \end{bmatrix} = \begin{bmatrix} r_1 & g_1 & b_1 \\ r_2 & g_2 & b_2 \\ r_3 & g_3 & b_3 \end{bmatrix} \begin{bmatrix} R \\ G \\ B \end{bmatrix}$$

Fig. 1 Prior art

| G Values | Output values: G*g1 |
|---|---|
| 0, 1, 2, 3, 4, 5, 6, 7 | g1[0] |
| 8, 9, 10, 11, 12, 13, 14, 15 | g1[1] |
| 16, 17, 18, 19, 20, 21, 22, 23 | g1[2] |
| ⋮ | ⋮ |
| 240, 241, 242, 243, 244, 245, 246, 247 | g1[30] |
| 248, 249, 250, 251, 252, 253, 254, 255 | g1[31] |

APPARATUS FOR COLOR CONVERSION AND METHOD THEREOF

BACKGROUND OF INVENTION

1. Field of the Invention

The invention relates to color conversion of display devices, and more particularly, to an apparatus for converting a first color in a first color space to a second color in a second color space and a method thereof.

2. Description of the Prior Art

Graphic systems convert image signals into a visible form and vice versa. Examples of common graphic systems include: cathode-ray tube (CRT) monitors, liquid crystal display (LCD) monitors, projection displays, digital cameras, scanners, camcorders, printers, etc. Different graphic systems have different image signal requirements meaning that the image signals for a particular graphic system are not necessarily compatible with other graphic systems. For example, the image signal format used in a digital overhead projector is not the same image signal format used in a printer. Even among graphic systems that both use RGB image signals, such as two LCD monitors, because each monitor has different display characteristics, the image signals producing a particular color on one monitor do not necessarily produce the identical color on another monitor. The particular display characteristics for a graphic system are also referred to as the device color space. Difficulties arise when trying to accurately reproduce color across open systems having different devices using different color spaces. Particularly with the advent of the Internet, it is imperative that all graphic systems exchange color information accurately and easily.

The International Color Consortium (ICC) has proposed a solution to the problem of communicating color in open systems, which involves attaching a profile for the input color space to the image file in question. This is appropriate for high end users but there are a broad range of users that do not require this level of flexibility and control. Additionally, most existing file formats do not support color profile embedding and, in fact, there are many applications that oppose appending any extra data to data files.

The standard default RGB color space (sRGB) developed by Hewlett-Packard and Microsoft provides a single RGB representation of color independent of the graphic system and has been standardized by the International Electrotechnical Commission (IEC) as IEC 61966-2-1. When using the sRGB specification, RGB values in the sRGB color space must be mapped to a corresponding RGB value in the destination color space and vice versa. Performing a mapping involves executing a matrix multiplication to adjust a first color value in the first color space to a second color in a second color space.

Figure 1:
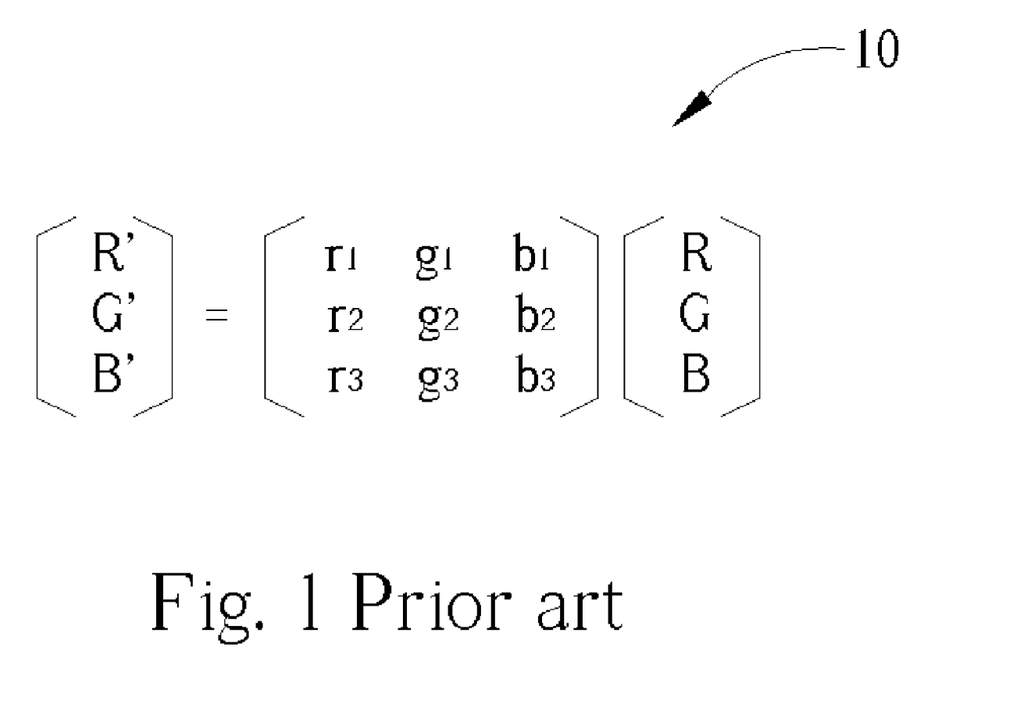
FIG. 1 is the sRGB conversion formula according to the prior art.

FIG. 1 shows the sRGB conversion formula 10 for mapping an sRGB value (R, G, B) to a destination dependent color space value (R',G', B') according to the sRGB specification. As shown in FIG. 1, the second red value R' is formed using a portion of the first red value R, the first green value G, and the first blue value B depending on the adjustment coefficients r1, g1, and b1 respectively. Similarly, the second green value G' and the second blue value B' are both formed using a portion of the first red value R, the first green value G and the first blue value B. The sRGB values are stored as 8 bit integers and the adjustments coefficients are stored as 10-bit floating-point values. Using standard matrix multiplication, the following formulas for the R', G', and B' values are derived:

$$R'=(R*r1+G*g1+B*b1)$$

$$G'=(R*r2+G*g2+B*b2)$$

$$B'=(R*r3+G*g3+B*b3)$$

To calculate the second red value R', the first RGB values are first converted to floating-point values:

$$R_{float}=R/255.0$$

$$G_{float}=G/255.0$$

$$B_{float}=B/255.0$$

A multiplier then multiplies the $R_{float}$, $G_{float}$, and $B_{float}$ with the first red adjustment coefficient r1, the first green adjustment coefficient g1, and the first blue adjustment coefficient b1 respectively and adds the multiplication results together. The second floating-point red value is then converted back to an 8-bit integer and similar procedures are followed for the G' and the B' values. The following formulas show the full process and can be computed concurrently if sufficient hardware resources are available:

$$R'=\text{round}(255.0*[r1*R_{float}+g1*G_{float}+b1*B_{float}])$$

$$G'=\text{round}(255.0*[r2*R_{float}+g2*G_{float}+b2*B_{float}])$$

$$B'=\text{round}(255.0*[r3*R_{float}+g3*G_{float}+b3*B_{float}])$$

In today's competitive consumer electronic marketplace, the performance of graphic systems must be as high as possible while keeping the price as low as possible. In other words, the conversion from a first color space to a second color space needs to be executed as fast as possible and with minimal hardware requirements. However, the conversions from integer to floating point, the conversions from floating point to integer, and the multiplications all require non-trivial processing time and specialized hardware. An efficient and cost effective implementation is needed.

SUMMARY OF INVENTION

It is therefore a primary objective of the claimed invention to provide a method and apparatus for color conversion having high-speed and minimal hardware, to solve the above-mentioned problems.

According to the claimed invention, a color conversion apparatus is disclosed for converting a first color space to a second color space, wherein both the first and the second color space at least include a first color element and a second color element. The color conversion apparatus comprises a look-up-table for storing a relationship between the first color space and the second color space and a converter for converting the first color space to the second color space according to the relationship stored in the look-up-table.

According to the claimed invention, a method of color conversion is disclosed for converting a first color space to a second color space, wherein both the first and the second color space at least include a first color element and a second color element. The method comprises providing a look-up-table for storing a relationship between the first color space and the second color space, and converting the first color space to a second color space according to the relationship stored in the look-up-table.

These and other objectives of the claimed invention will no doubt become obvious to those of ordinary skill in the art after reading the following detailed description of the preferred embodiment that is illustrated in the various figures and drawings.

DETAILED DESCRIPTION

According to the present invention, a lookup table is used to replace the hardware circuit for calculating each multiplication in the formula 10 shown in FIG. 1. For example, the multiplication of R with the adjustment coefficient r1 can be replaced with a 256-element lookup table. The lookup table is indexed with the R-value and maps to the result of the multiplication of R with the adjustment coefficient r1. The lookup table can be implemented with a 256-byte memory having the address inputs connected to the R-value and the value stored at each address being the result of R*r1 for all values of R. This implementation runs much faster than a hardware multiplier and eliminates the need for specialized conversion and multiplication hardware. The disadvantage of a 256-element lookup table is that nine 256-byte memories are required, one for each multiplication by an adjustment coefficient.

Figure 2:
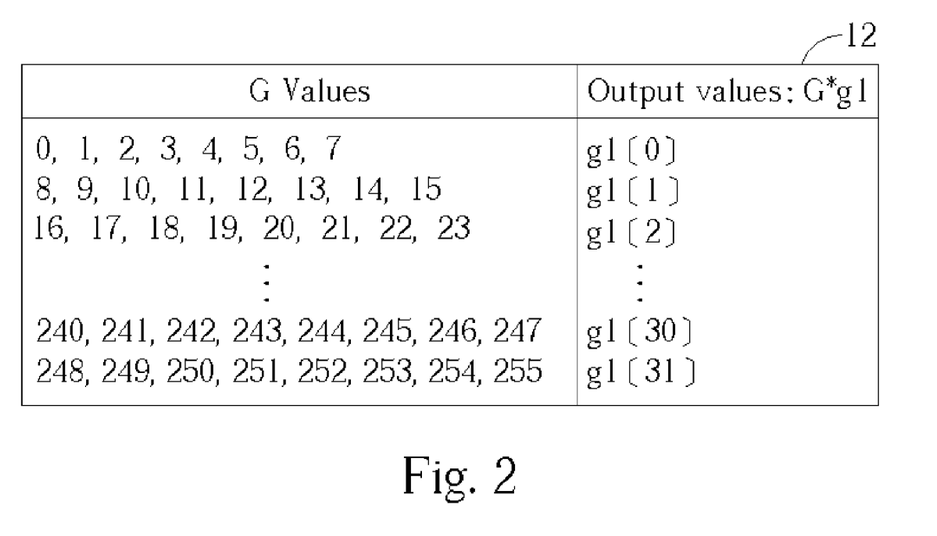
FIG. 2 is a lookup table for implementing the G*g1 multiplication according to the present invention.

FIG. 2 shows a simplified lookup table 12 for implementing the G*g1 multiplication. Although, the second red value R' is affected by the first red value R, the first green value G, and the first blue value B; in actual practice, the first green value G and the first blue value B have a very small effect on the second red value R'. This means that the lookup tables for the adjustment coefficients g1 and b1 can be simplified. As shown in FIG. 2, first green values G are grouped together and the members of each group return the same result for the multiplication of G*g2. For example, G-values belonging to the set of {0, 1, 2, 3, 4, 5, 6, 7} all return the same output value g1[0]. Although mathematically incorrect, this approximation is justified due to the insignificant difference between the different members of each group and the small overall effect of the first green value G on the second red value R'. Similar simplified lookup tables are used for the other low effect adjustment coefficients b1, r2, b2, r3, and g3.

Additionally, it should be mentioned that although FIG. 2 shows groups of eight first green values G, depending on different destination color spaces, other group sizes can also be used. If, for a particular destination color space, the first green value G has a greater effect on the second red value R', the g1 lookup table can have smaller groups of G-values. Smaller groups of G values increases the resolution of the g1 lookup table at the cost of increased table size. Likewise, if the first green value G has an even smaller effect on the second red value R', the g1 lookup table can have larger groups of G values. The group sizes for the other lookup tables b1, r2, b2, r3, and g3 can also be adjusted to reflect their actual effect on the second color value.

Figure 3:
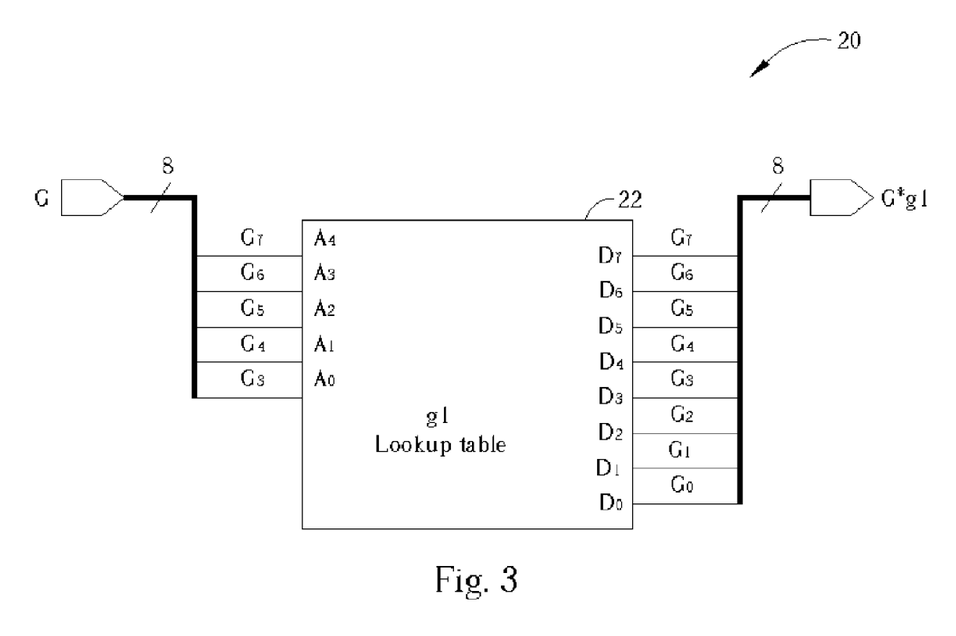
FIG. 3 is a diagram showing the lookup table of FIG. 1 implemented with a 32-byte memory.

FIG. 3 shows a schematic diagram 20 of the lookup table of FIG. 2 implemented with a 32-byte memory 22. The memory 22 has a 5-bit address input having an MSB of $A_4$ and an LSB of $A_0$, and an 8-bit data output having an MSB of $D_7$ and an LSB of $D_0$. The first green value G is an 8-bit value having an MSB of $G_7$ and an LSB of $G_0$ and the top five most significant bits ($G_7$ to $G_3$) are connected to the memory 22 address inputs ($A_4$ to $A_0$) respectively. Based on the address, the memory 22 returns the result of the multiplication of G*g1, which is stored at the particular address location. By not using the least significant bits of the first green value G, the G-values are effectively grouped into groups of eight as in FIG. 2.

As stated earlier, the second red value R' is primarily determined by the first red value R. In fact, the color conversion between the first red value R and the second red value R' can be accomplished through gamma correction. Similarly the second green value G' is primarily determined by the gamma correction of the first green value G and the second blue value B' is primarily determined by the gamma correction of the first blue value B. To further simply the implementation, the multiplications by the adjustment coefficients r1, g2, and b3 in FIG. 1 can be directly replaced with the result of a gamma correction circuit. Gamma correction accounts for the non-linear detection of luminance by the human eye under different light conditions. As gamma correction is well known in the art, further description of the actual gamma correction circuit is herby omitted.

Figure 4:
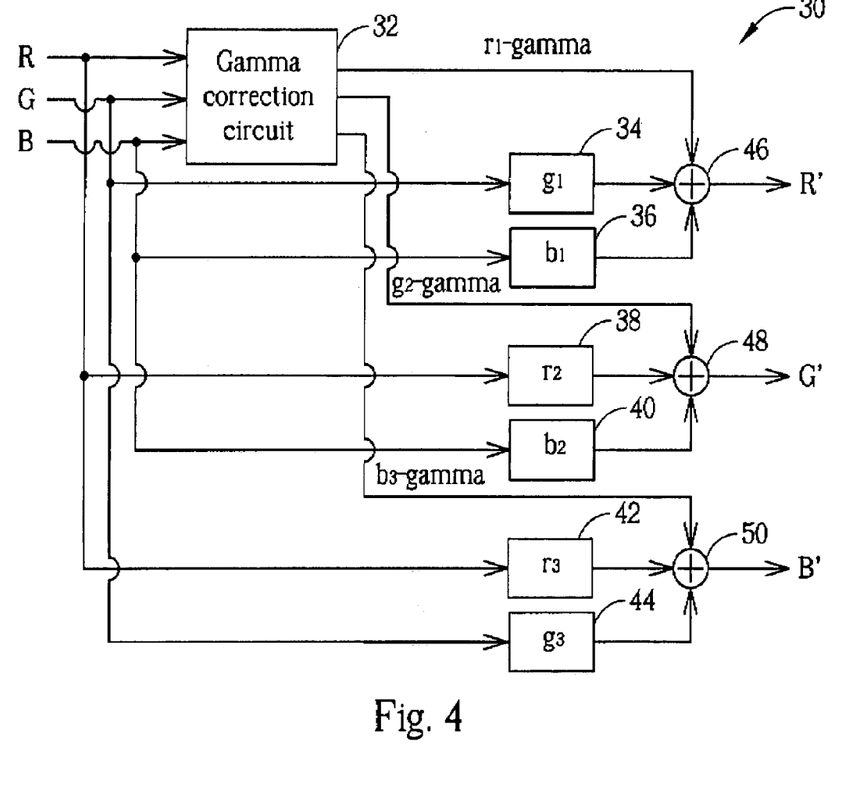
FIG. 4 is a first embodiment of a color conversion apparatus of the present invention.

FIG. 4 shows a first embodiment of a color conversion apparatus 30 of the present invention. The color conversion apparatus 30 converts a first color having red, green, and blue values (R, G, B) in a first color space to a second color having second red, green, and blue values (R', G', B') in a second color space. The color conversion apparatus 30 includes a gamma correction circuit 32, a g1 lookup table 34, a b1 lookup table 36, an r2 lookup table 38, a b2 lookup table 40, an r3 lookup table 42, a g3 lookup table 44, a first adder 46, a second adder 48, and a third adder 50. Each of the lookup tables 34, 36, 38, 40, 42, 44 is implemented with a 32-byte memory as shown in FIG. 3. The first red value R is connected to the gamma correction circuit 32, the r2 lookup table 38, and the r3 lookup table 42. The first green value G is connected to the gamma correction circuit 32, the g1 lookup table 34, and the g3 lookup table 44. Finally the first blue value B is connected to the gamma correction circuit, the b1 lookup table 36, and the b2 lookup table 40. The output of the g1 lookup table 34, which is the result of the multiplication of G*g1; the output of the b1 lookup table 36, which is the result of the multiplication of B*b1; and the gamma corrected R-value r1-gamma are added together by the first adder 46. The output of the first adder 46 is the second red value R'. The second adder 48 adds together the output of the r2 lookup table 38, which is the result of the multiplication of R*r2; the output of the b2 lookup table 40, which is the result of the multiplication of B*b2; and the gamma corrected G-value g2-gamma to produce the second green value G'. Similarly, the third adder 50 adds together the output of the r3 lookup table 42, which is the result of the multiplication of R*r3; the output of the g3 lookup table 44, which is the result of the multiplication of G*g3; and the gamma corrected B-value b3-gamma to produce the second green value B'.

Figure 5:
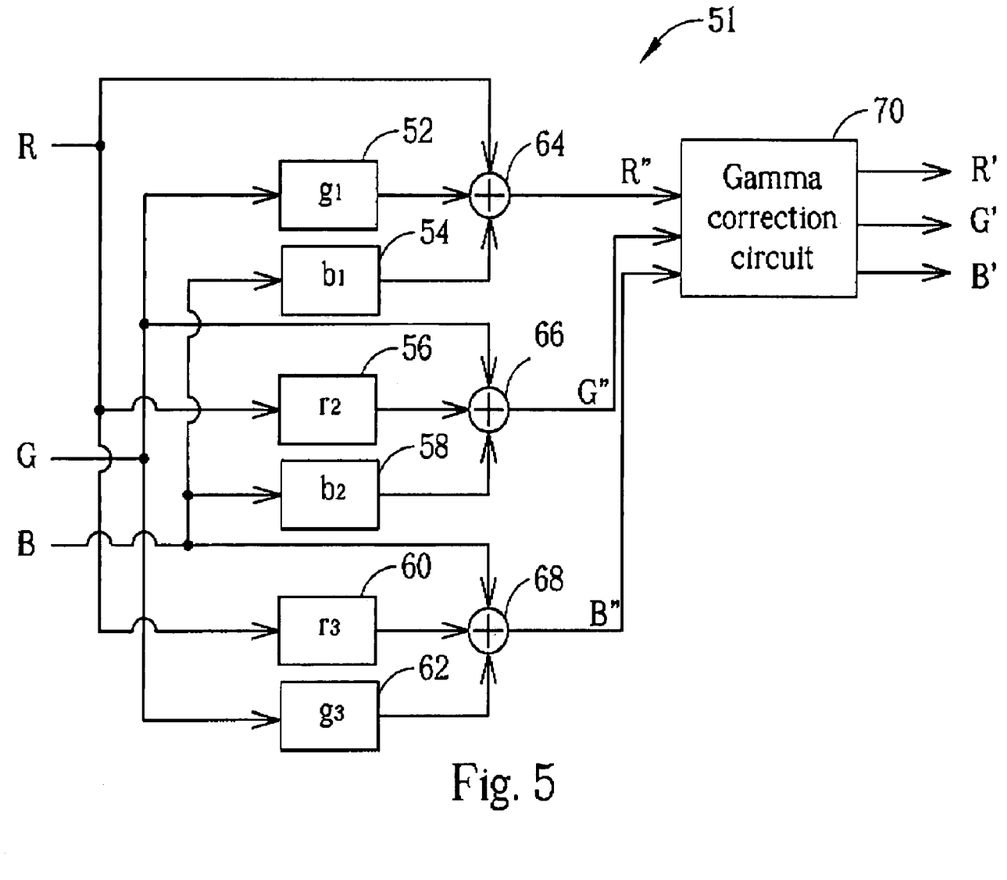
FIG. 5 is a second embodiment of a color conversion apparatus of the present invention.

FIG. 5 shows a second embodiment of a color conversion apparatus 51 of the present invention. The color conversion apparatus 51 converts a first color having red, green, and blue values (R, G, B) in a first color space to a second color having second red, green, and blue values (R', G', B') in a second color space. The color conversion apparatus 51 includes a g1 lookup table 52, a b1 lookup table 54, an r2 lookup table 56, a b2 lookup table 58, an r3 lookup table 60, a g3 lookup table 62, a first adder 64, a second adder 66, a third adder 68, and a gamma correction circuit 70. Each of the lookup tables 52, 54, 56, 58, 60, 62 is implemented with a 32-byte memory as shown in FIG. 3. The first red value R is connected to the r2 lookup table 56 and the r3 lookup table 60. The first green value G is connected to the g1 lookup table 52 and the g3 lookup table 62. Finally the first blue value B is connected to the b1 lookup table 54 and the b2 lookup table 58. The output of the g1 lookup table 52, which is the result of the multiplication of G*g1, and the output of the b1 lookup table 54, which is the result of the multiplication of B*b1, are added together by the first adder 64. The second adder 66 adds together the output of the r2 lookup table 56, which is the result of the multiplication of R*r2, and the output of the b2 lookup table 58, which is the result of the multiplication of B*b2. Similarly, the third adder 68 adds together the output of the r3 lookup table 60, which is the result of the multiplication of R*r3, and the output of the g3 lookup table 62, which is the result of the multiplication of G*g3. The output of the first adder 64 (R"), the second adder 66 (G"), and the third adder 68 (B") are connected to the gamma correction circuit 70 and the output of the gamma correction circuit 70 is the second color value comprising the second red value R', the second green value G', and the second blue value B'.

Figure 6:
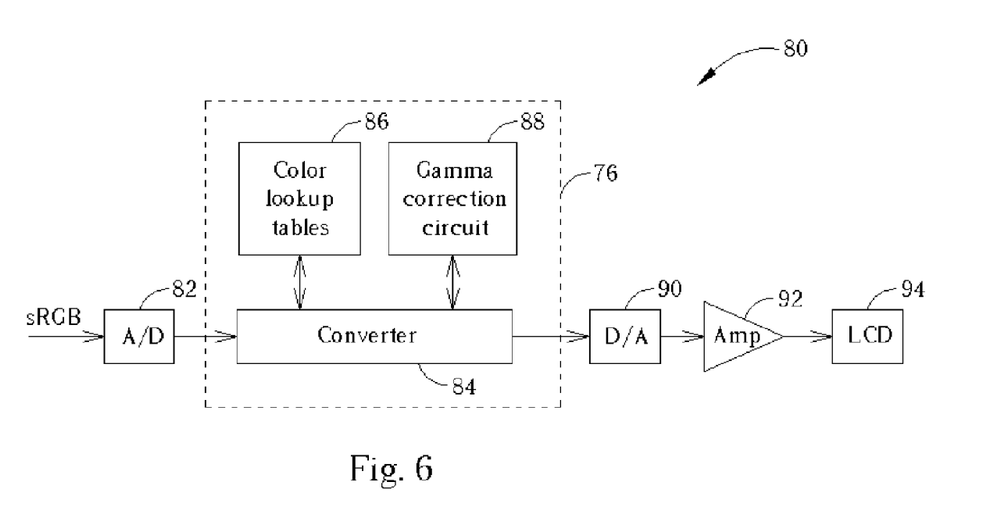
FIG. 6 is a third embodiment of an LCD color conversion apparatus of the present invention.

FIG. 6 shows a third embodiment of an LCD color conversion apparatus 80 of the present invention. The LCD color conversion apparatus 80 includes an A/D converter 82, a converter 84, a plurality of color lookup tables 86, a gamma correction circuit 88, a D/A converter 90, an amplifier 92, and an LCD display 94. The converter 84, the plurality of color lookup tables 86, and the gamma correction circuit 88 form a color conversion apparatus 76, which can be implemented as shown in FIG. 4 or FIG. 5. A first color having red, green, and blue components in the sRGB color space is converted to 8-bit digital form by the A/D converter 82. The converter 84 uses the plurality of lookup tables 86 and the gamma correction circuit 88 to convert the incoming color in the sRGB color space to a corresponding color in the color space of the LCD display 94. The output of the converter 84 is connected to the D/A converter 90, which converts the corresponding color to analog RGB signals. The analog RGB signals are amplified by the amplifier 92 and drive the LCD display 94.

Figure 7:
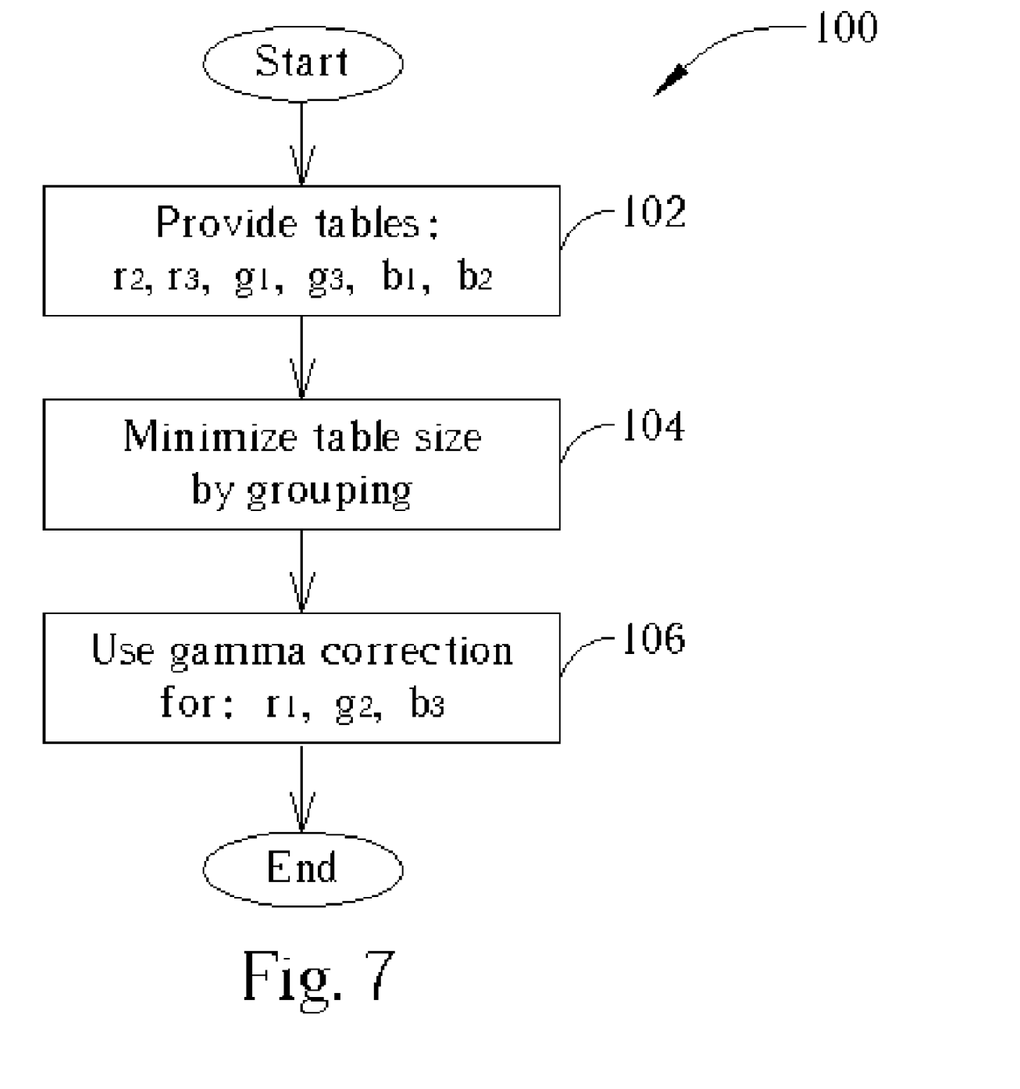
FIG. 7 is a flowchart describing the method of color conversion according to the present invention.

FIG. 7 shows a flowchart 100 describing the method of color conversion according to the present invention. The flowchart 100 describes the method for converting a first color having red, green, and blue values (R, G, B) in a first color space to a second color having second red, green, and blue values (R', G', B') in a second color space and includes the following steps:

Step 102: Provide a plurality of color lookup tables for the multiplications by the adjustment coefficients r2, r3, g1, g3, b1, and b2. The lookup tables provide the multiplication of R*r2, R*r3, G*g1, G*g3, B*b1, and B*b2 respectively, as required by the sRGB conversion formula 10 shown in FIG. 1.

Step 104: Minimize the lookup table sizes by grouping similar input colors. Because there is very little numerical difference between the adjacent input colors and a very small overall effect on the second color, each lookup table is reduced in size by lowering the number of output values. Similar input colors values are grouped together and mapped to the same multiplication result in each lookup table. A memory can be used to implement each lookup table, the address inputs of the memory being connected to the upper most significant bits of the input color. With 8-bit RGB values, if groups of eight input colors map to the same output value, the lookup table implementation is reduced from a 256-byte memory to a 32-byte memory with no adverse effect on color conversion performance.

Step 106: Use a gamma correction circuit to calculate the adjustment coefficients r1, g2, and b3. Because the gamma correction of the first color value is the primary cause of adjustment on the second color value, the multiplications by r1, g2, and b3 are directly replaced with the result of the gamma correction circuit. By using the gamma correction circuit, three lookup tables are eliminated and the overall design is simplified.

Those skilled in the art will readily observe that numerous modifications and alterations of the device may be made while retaining the teachings of the invention. Accordingly, that above disclosure should be construed as limited only by the metes and bounds of the appended claims.

What is claimed is:

1. A method for converting an input color being in a RGB color space to an output color being in RGB color space, the method comprising:

looking up a first color element of the input color in a first lookup table to generate a first converted color element; wherein the first color element and the first converted color element belong to the same color component;

looking up a second color element of the input color in a second lookup table to generate a second converted color element; wherein the second color element and the second converted color element belong to the same color component;

converting a third color element to generate a third converted color element by gamma correction circuit; wherein the third color element and the third converted color element belong to the same color component;

wherein one of the color elements of output color is dependent to the first, second and third converted color elements;

the first, second and third converted color elements respectively belong to different color components;

the color component is one component of RGB; and RGB including R,G, and B components respectively representing red, green, and blue colors.

2. The method of claim 1, wherein further comprising summing the first, the second and the third converted color element.

3. The method of claim 1, wherein further comprising summing the first converted color element, the second converted color element and one of the color elements of input color; wherein the first converted color element, the second converted color element and one of the color elements of input color respectively belong to different color components.

4. The method of claim 1, wherein one bit from the value of the first converted color element is corresponding to serial eight values of the first color element; and one bit from the value of the second converted color element is corresponding to serial eight values of the second color element.

5. The method of claim 1, wherein the first lookup table is indexed by using a number of bits from values of the first color element; and the second lookup table is indexed by using the number of bits from values of the second color element.

6. The method of claim 5, wherein the number of bits comprise a number of most significant bits.

7. The method of claim 6, wherein remaining least significant bits of the first and second color elements are not utilized in generating the first and second converted color elements.

8. The method of claim 1, wherein the first and the second color element are five bits data; and the first and the second converted color element are eight bits data.

9. The method of claim 1, wherein the first, the second and the third color elements respectively belong to red, green and blue color components.

10. The method of claim 1, wherein the first, the second and the third color elements respectively belong to green, blue and red color components.

11. The method of claim 1, wherein the first, the second and the third color elements respectively belong to blue, red and green color components.

12. The method of claim 1, wherein the method is applied in a liquid crystal display (LCD) controller.

* * * * *